United States Patent
Robinson et al.

[15] 3,657,730
[45] Apr. 18, 1972

[54] METHOD FOR DETERMINING RESIDUAL HYDROCARBONS PRESENT IN A SUBTERRANEAN EARTH FORMATION

[72] Inventors: Joseph D. Robinson, Houston, Tex.; Jay D. Loren, New Orleans, La.; William T. Higdon, Lamoni, Iowa

[73] Assignee: Shell Oil Company, New York, N.Y.

[22] Filed: Jan. 14, 1970

[21] Appl. No.: 2,712

[52] U.S. Cl. ............................................................ 324/0.5
[51] Int. Cl. ........................................................... G01n 27/78
[58] Field of Search ........................... 324/0.5 R, 0.5 A, 0.5 G

[56] References Cited

UNITED STATES PATENTS

| | | | |
|---|---|---|---|
| 3,188,556 | 6/1965 | Worthington | 324/0.5 G |
| 3,456,183 | 7/1969 | Codrington | 324/0.5 G |
| 3,462,674 | 8/1969 | Baker | 324/0.5 G |

*Primary Examiner*—Michael J. Lynch
*Attorney*—Louis J. Bovasso and J. H. McCarthy

[57] ABSTRACT

A method for determining residual hydrocarbons present in a subterranean earth formation by quantitatively determining the amplitude of the proton free-precession signal that is due to the protons contained in the residual hydrocarbons that are present in an interval of the subterranean hydrocarbon-bearing earth formation. The mud cake is removed or made permeable along a section of a well borehole adjacent the interval to be tested. An aqueous solution is injected down the well borehole and into the interval to be tested until the injected fluid occupies substantially all of the space within the well borehole and the interval to be tested that was previously occupied by other aqueous liquids in a zone extending into the interval to be tested at least substantially as deeply as a nuclear magnetism measuring device is to be responsive to proton free-precession signals. The solution which is injected contains sufficient dissolved paramagnetic material to provide a water phase nuclear magnetism thermal relaxation time that is too short to be responded to by the nuclear magnetism measuring device. A nuclear magnetism measuring device is disposed within the well borehole adjacent the interval to be tested and measurements are made of the responses with time of the device to (a) noise in the absence of polarization and (b) proton free-precession signal plus noise. At least one function of the noise and at least one function of the signal plus noise are combined to determine the signal amplitude at the end of the polarization.

12 Claims, 8 Drawing Figures

Patented April 18, 1972

CONNATE WATER INFLOW

MAGNETITE FREE MUD

INVENTORS:
J. D. ROBINSON
W. T. HIGDON
J. D. LOREN
BY: *Louis J. Bovasso*
THEIR ATTORNEY

METHOD FOR DETERMINING RESIDUAL HYDROCARBONS PRESENT IN A SUBTERRANEAN EARTH FORMATION

BACKGROUND OF THE INVENTION

1. Field of the Invention.

The invention relates to nuclear magnetic logging; and, more particularly, to a method using a nuclear magnetism measuring device for determining the amount of residual hydrocarbons that are present in a subterranean earth formation.

2. Description of the Prior Art

It has been suggested in recent years to use nuclear magnetic logging techniques to determine the presence of hydrocarbons in subterranean earth formations. A determination that hydrocarbons are present, by means of logging measurements, is particularly useful in certain types of formations, especially in the evaluation of secondary recovery prospects.

The concept of introducing paramagnetic materials into subterranean earth formations for assistance in the nuclear magnetic logging thereof is discussed in various prior art patents, as for examples in a U.S. Pat. No. 3,188,556. The objective of this and similar patents is to use nuclear magnetic logging techniques to distinguish whether the protons within fluids in and around a well borehole extending into subterranean earth formation are contained in water or hydrocarbons. In the subject patent, a change in the relaxation time of one of the fluids, such as water or oil, in and around a well borehole is effected so that a measurable contrast in the relaxation time exists between the two fluids. At no time in this or any other prior art patent is it suggested that such nuclear magnetic logging techniques may be used to determine the residual oil saturation (oil per unit volume of formation) of a subterranean earth formation in a quantitative manner. Further, in the subject patent, the paramagnetic material is introduced into the mud system with normal and generally small amount of filtrate invasion through the mud cake being the mechanism for introducing the paramagnetic ion into the formation pore space. Thus, with the prior technique, it would be difficult to achieve the uniform necessary depth of invasion into the formation being investigated that would be required in order to provide a quantitative measurement.

SUMMARY OF THE INVENTION

It is an object of this invention to provide a method for quantitatively determining the residual oil saturation, i.e,. the amount of oil per unit volume of earth formation, of a subterranean earth formation using nuclear magnetic logging techniques.

It is a further object of this invention to provide an improved nuclear magnetic logging technique for determining the residual oil saturation of an oil- and water-bearing subterranean earth formation wherein the response from the water phase of the formation is extinguished.

It is a still further object of this invention to provide an improved nuclear magnetic logging technique wherein an aqueous solution for extinguishing the water phase response is injected into the subterranean earth formation being measured in a sufficient quantity to achieve a substantially uniform invasion of all of the portion of the earth formation to which the measuring device is responsive.

It is an even further object of this invention to provide a method for quantitatively determining the amplitude of the proton free-precession signal due to the protons contained in residual hydrocarbons present in a subterranean earth formation.

These and other objects are preferably accomplished by logging a well that has been extended into communication with an interval of a subterranean hydrocarbon-bearing earth formation. The wall of the bore-hole is treated to make it fluid permeable along the interval of the earth formation to be tested, by removing mud cake from the wall of the borehole and/or making the mud cake permeable along the interval of earth formation. An aqueous solution is pumped through the borehole and injected into the interval of earth formation to be treated until the injected solution occupies all of the pore space that is occupied by aqueous liquid in a zone that is as extensive as the zone within which measurements are to be made of proton free-precession signals. The injected solution contains sufficient dissolved paramagnetic material to reduce the nuclear magnetism thermal relaxation time of protons in the aqueous solution to a time too short to be responded to by the nuclear magnetism measuring device to be used. A nuclear magnetism measuring device is positioned adjacent to the interval of the earth formation to be tested and measurements are made of its responses with time to (a) noise in the absence of proton free-precession signals and (b) proton free-precession signals plus noise. Functions of the magnitudes of those measurements are combined to indicate the amplitudes of the free-precession signals at the ends of the proton polarizations.

DESCRIPTION OF THE PREFERRED EMBODIMENT

Figure 1:
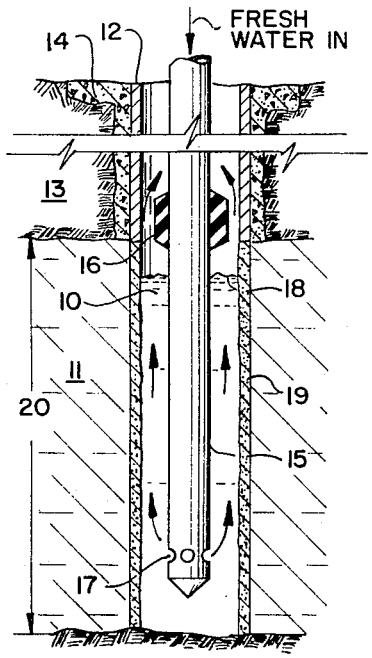
FIG. 1 is a vertical sectional view of a first step in the treatment of a subterranean earth formation in accordance with the teachings of our invention.

Referring to the drawing, FIG. 1 shows a well borehole 10 extending into communication with a hydrocarbon-bearing subterranean earth formation 11. Well borehole 10 is preferably cased, as at casing 12, at least to the upper extent of the earth formation 11 adjacent overlying earth formation 13. Casing 12 is sealed therein by suitable cementing 14. A tubing string 15 is disposed in well borehole 10. A packer, such as inflatable packer 16, in its unset or deflated condition in FIG. 1, is disposed on tubing string 15 preferably immediately above the casing shoe or alternatively immediately adjacent the upper extent of earth formation 11. In this manner, preferential fluid communication may be established between the earth surface and substantially all of the pores of an oil-and-water-containing earth formation that are encountered along a vertical interval that exceeds the vertical responsive interval of a proton relaxation measuring device. In FIG. 1, the interval 20 to be investigated is the extent of formation 11 adjacent well borehole 10. In well boreholes extending below the earth formation interval 20 to be investigated, conventional well borehole equipment, such as wall-latching borehole plugs, straddle packers, etc., may be used to establish such fluid communication.

Figure 3:
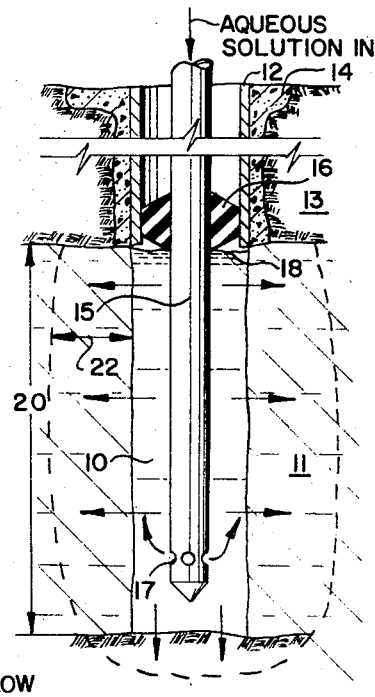

Preferably, the selected well borehole section is filled with a readily distinguishable fluid, such as fresh water, by injection down tubing string 15 and into the annulus formed between tubing string 15 and formation 11. This step spots a liquid that is distinct from the formation water present in well borehole 10 in a position in which it can be used (a) as an indicator of the arrival of the front of formation water that is to be subsequently produced, in future steps, and (b) as a means of determining the actual depth of invasion that is to be obtained in subsequent injection operations. The indication (a), supra, is obtained by detecting the arrival at the earth surface of brine from formation 11 and the depth determination (b), supra, is obtained by preparing sets of resistivity logs having different depths of investigations, all as is well known in the art. A set of resistivity logs prepared with fresh water in the earth formation 11 and fresh water mud in well borehole 10 provides data for a determination, by conventional log analysis procedures, of the depth of invasion of earth formation 11 obtained in test step 3 (FIG. 3, hereinbelow).

Referring once again to FIG. 1, after the preferred fresh water injection, fresh water is present in well borehole 10 below the liquid level 18 and salt water and/or mud, i.e., formation fluids, are present in well borehole 10 above level 18. A conventional mud cake 19 is present on the wall of the interval 20 to be treated, i.e., adjacent earth formation 11.

Figure 2:
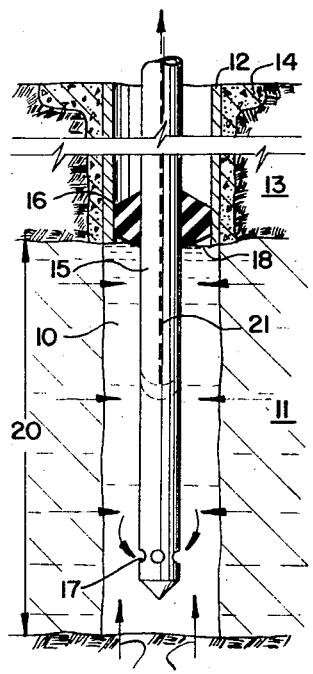
FIGS. 2–6 are further steps in the treatment of the formation of FIG. 1.

Referring now to FIG. 2 wherein like numerals refer to like parts of FIG. 1, packer 16 is set so that the interval 20 is sealed off from the overlying earth formation 13. The fluid impermeability of mud cake 19 is preferably removed by swabbing or gas-lifting the tubing string 15 until formation water is produced at the earth surface and/or mud cake 19 is removed from the wall of the well borehole 10. Permeability along the wall of well borehole 10, which is always to some extent coated with a mud cake, is established by washing mud cake back into the well borehole 10. The arrows in FIG. 2 show the zones of connate water inflow from earth formation 11 back up tubing string 15.

The foregoing step is advantageous since it avoids any need for introducing contaminants into the formation interval 20 being investigated. Alternatively, the fluid impermeability of the mud cake 19 may be removed mechanically, as by means of scratchers, scrapers, etc., and/or chemically made permeable as by means of injections or washings with mud acids or mud cake solvents (e.g., for oil base muds), etc..

In FIG. 3 in which like numerals again refer to like parts of FIGS. 1 and 2, a known volume of an aqueous solution is being pumped through well borehole 10 and injected into interval 11 until substantially all of the space within well borehole 10 and interval 11 that was previously occupied by other aqueous liquids is occupied by the aqueous solution within a zone 22 (indicated by the dotted lines) extending into interval 11 at least substantially as deeply as a nuclear magnetism measuring device is to be responsive to proton free-precession signals. For example, a diameter of invasion of approximately five feet is generally sufficient. The solution should contain sufficient dissolved paramagnetic material to provide a short nuclear magnetism thermal relaxation time that is not responded to by the measuring device that is used. With one such measuring device a 0.03 molar manganous versene solution, which provided a relaxation time of less than about fifteen milliseconds was sufficient. Care is preferably taken to insure a resistivity contrast between the formation water and the injected aqueous fluid so that electrical logs may be used to establish zones of fluid entry and to estimate depths of invasion in the manner discussed hereinabove.

In general, the aqueous paramagnetic solution may contain a solution of substantially any paramagnetic material that is soluble enough and stable enough to maintain a sufficiently short relaxation time throughout the duration of the nuclear magnetism measurements. The thermal relaxation time of the aqueous phase must be short enough that substantially all of the measuring device response to the precession of protons in the aqueous phase will have decayed by the time the measuring device first responds to the precession of protons in the oil phase. With certain commercially available measuring devices an aqueous phase relaxation time of less than 15 milliseconds is suitable. Solutions of chelated ions are preferred since they have been discovered to be sufficiently soluble in water, sufficiently insoluble in oil, and sufficiently resistant to absorption on the clay in clayey earth formations or clay base muds. However, in some situations the use of the relatively expensive chelating agent may be avoided by using relatively high concentrations of, for example, solutions containing ions such as cupric ions, ferric ions, ions of iron group, rare earth metal ions, etc.; particularly when such ions are dissolved in solutions containing materials capable of maintaining the valence of the ions in the state in which the ions are paramagnetic.

In FIG. 4, where once again like numerals refer to like parts of FIGS. 1 through 3, a quantity of mud, preferably using the fluid from the step described hereinabove with respect to FIG. 3 as make-up water, containing no magnetite is being pumped down tubing string 15, out perforations 17 and into formation 11 to form mud cake 23 on the wall of well borehole 10. This step ensures the building-up of a mud cake on the wall of well borehole 10 without invasion of magnetite into formation 11.

The zone 24 indicates a zone subsequently permeated with mud filtrate containing manganous versene in sufficient concentration to reduce the thermal relaxation time below the prescribed level.

Figure 4:
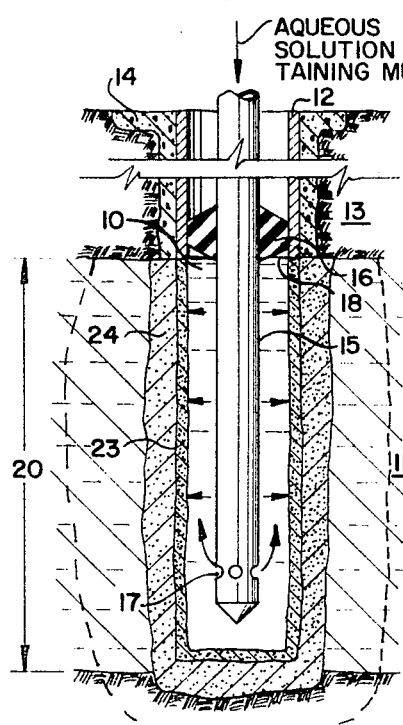
Figure 5:
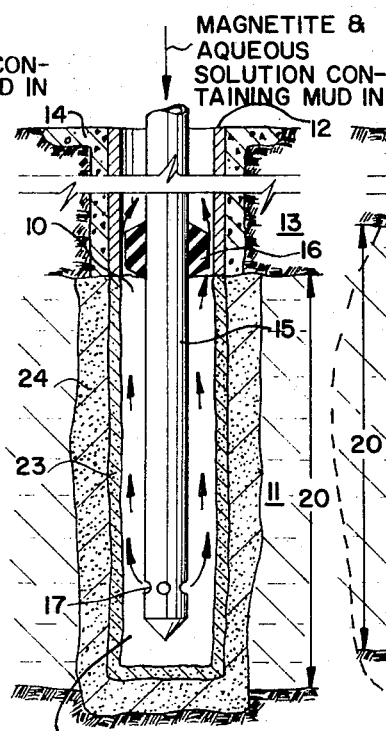

After establishing mud cake 23 in FIG. 4, packer 16 is released (FIG. 5) and a second quantity of mud containing magnetite in suspension and manganous versene in solution is introduced down tubing string 15, out perforations 17 and up the annulus formed between the wall of well borehole 10 and tubing string 15 (i.e., opposite the zone 20 being logged).

Where, as in these foregoing steps, a drilling mud is used to control fluid loss into the formation 11 while the well borehole 10 is filled with a liquid that provides a hydrostatic pressure sufficient to overbalance the formation fluid pressure, it is essential that such a mud contain a solution of the paramagnetic material. The use of such a mud is particularly preferred since it allows the injection tubing string 15 and formation packer 16 to be withdrawn without causing fluids to flow into the well borehole 10 and insures that subsequent mud filtrate invasion will not contribute to the observed signal.

Figure 6:
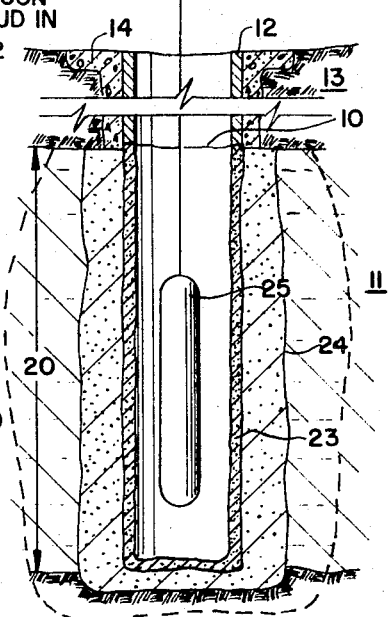

Thus, as illustrated in FIG. 6, a conventional nuclear magnetism measuring device 25 may be run down well borehole 10 adjacent zone 20. Measurements are then made, via device 25, of the amplitude of both the noise in the absence of polarization and the proton free-precession signal plus noise within well borehole 10. Where the noise envelope is Rayleigh distributed (narrow band Gaussian random noise), the average amplitude of the noise squared may be determined by averaging the squares of the individual measurements. Where other types of noise are present it may be desirable to use different functions of the measurements of noise and signal plus noise. The average amplitude of the noise may be measured by oscillographically recording the noise response and sampling its amplitude at the end of each of a selected series of increments of time, or by recording and digital processing, or by analog processing.

The device 25 with which the noise measurements are made may be actuated to provide a series of nuclear magnetism polarizations at each depth tested within the well borehole 10 in which the noise measurements are made. Measurements may be made of the responses of the device 25 to the proton free-precessions. The average amplitude of these measurements (which comprise the signal plus noise, as discussed hereinabove) may be determined by averaging the squares of the individual measurements.

Figure 7:
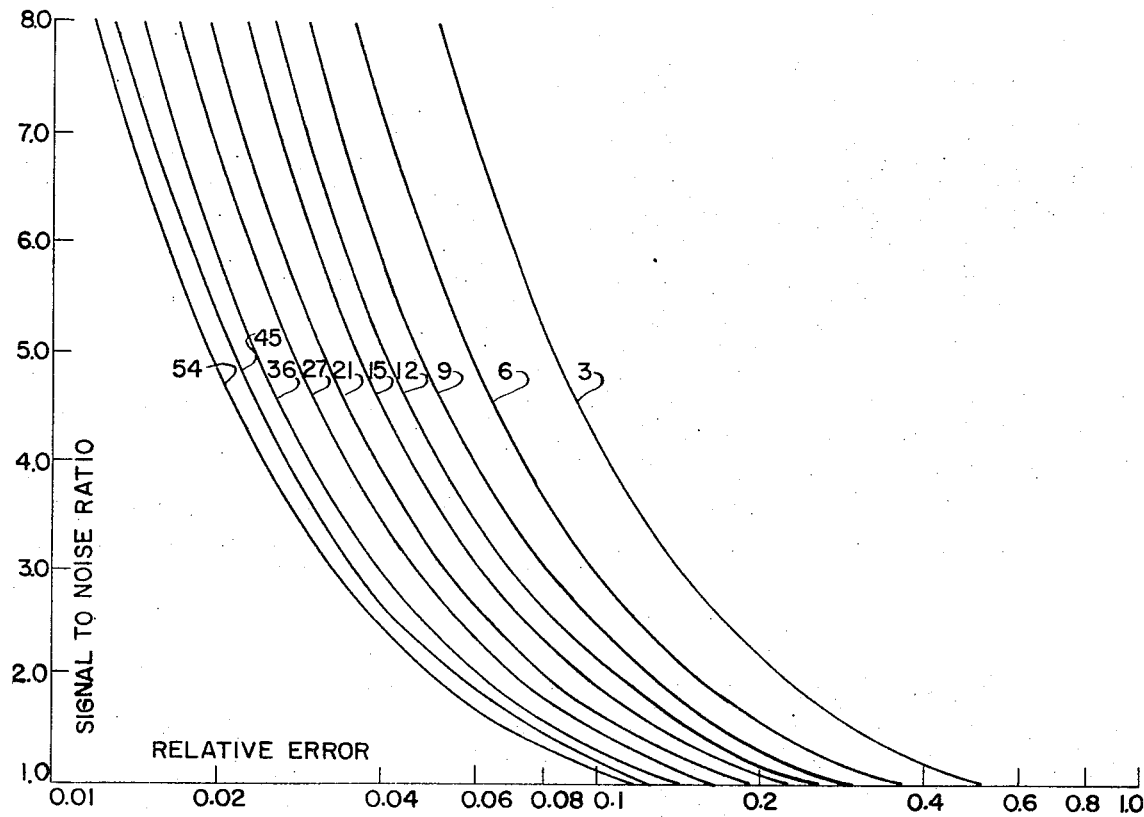
FIGS. 7 and 8 are graphical illustrations utilizing the data obtained in the treatment of the formation of FIG. 1.

The number of individual noise measurements may readily be made relatively large, e.g., several hundred. The number of individual measurements of the signal plus noise that are necessary (in each series of measurements) in order to obtain a selected degree of accuracy in the final result is dependent upon the ratio of the signal to noise. FIG. 7 provides a graphical illustration of the ratio of confidence-limit-to-signal versus the ratio of signal-to-noise. In FIG. 7, the signal-to-noise ratio comprises the signal amplitude to the root mean square of the noise amplitude. The relative error amounts to one standard deviation in the signal amplitude divided by signal. The numbers on the curves are the number of replications needed in order to provide a selected precision with respect to a given ratio of signal to noise. For a signal-to-noise ratio of 3.0, replications of, respectively, 6 and 15 are needed for amounts of deviation of not more than 10 percent and 6 percent.

The signal amplitude at the ends of the polarizations may be determined by combining a function of the noise with a function of the signal plus noise. If the noise envelope is Rayleigh distributed, this is preferably accomplished by subtracting the mean square of the thermal noise from the mean square of the signal plus noise and determining the square root of the difference. The value for each series of measurements provides a point on a plot from which the values for the graph of FIG. 8 may be determined.

It can be seen from the foregoing that the paramagnetic material content of the aqueous liquid phase present in an oil-containing earth formation may feasibly be made high enough to reduce the thermal relaxation time of the aqueous liquid to such an extent that it is effectively extinguished. For one tested field logging device, this end is attained by selecting a paramagnetic concentration such that the thermal relaxation time of the aqueous liquid was less than 10 milliseconds.

When the liquid phase response is so extinguished, quantitative measurements based upon nuclear magnetic logging data may be made of the amount of oil that is present in formation 11. Aqueous solutions of chelated ions are capable of extinguishing the relaxation signal from an aqueous solution. In addition, such solutions retain this capability in the presence of clay and/or oil.

In summary, in order to make quantitative measurements of the response from the oil, the formation 11 containing the oil must be invaded by an aqueous liquid in which the aqueous phase proton free-precession signal is effectively extinguished to at least substantially the full depth of the investigation of the nuclear magnetism measuring device 25. Such an invasion may be attained by first removing, or making permeable, the mud cake 19 on the face of the earth formation 11 to be investigated, injecting a sufficient amount of the specified aqueous liquid, and then depositing a mud cake 23 that is permeated with an aqueous liquid solution that contains a paramagnetic solute, as described hereinabove.

EXAMPLE

The following example utilizes the steps described hereinabove for determining the residual oil saturation of a hydrocarbon-bearing subterranean earth formation.

Figure 8:
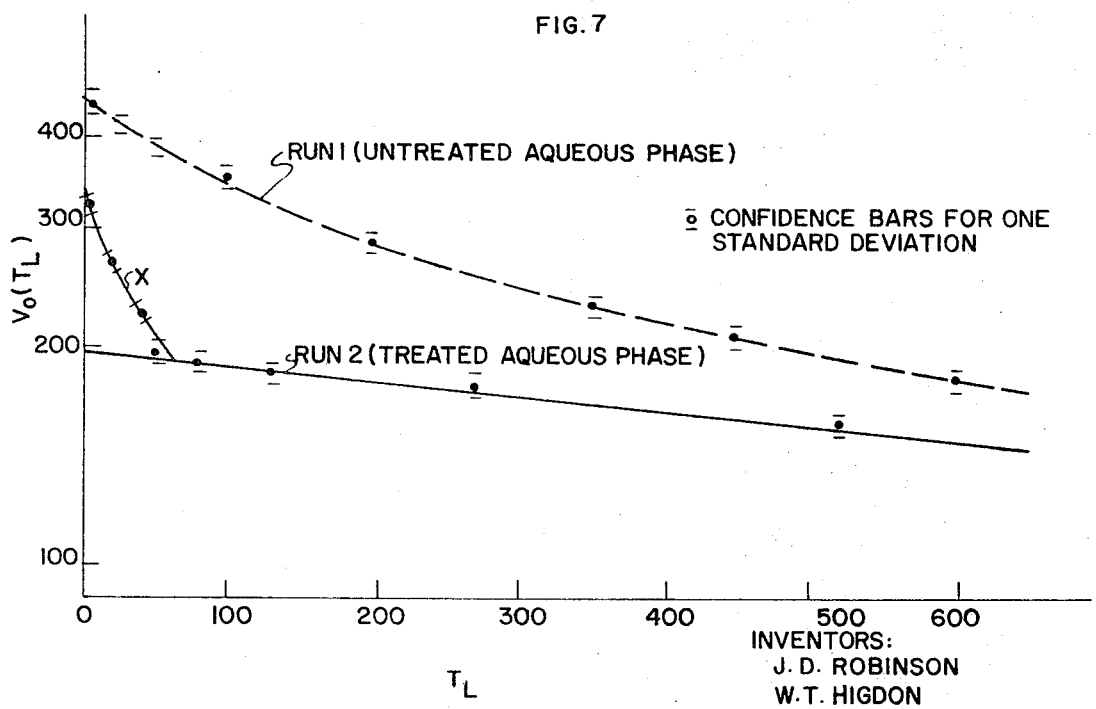

A Paluxy sandstone core having a porosity of 26.0 percent and an air permeability of two darcies was treated in the manner described hereinabove. The thermal relaxation curves as plots of $V_o(T_L)$ (corrected for high field − low field ratio) versus $T_L$ were determined. FIG. 8 shows data for the rock containing a residual Soltrol, petroleum naphtha manufactured by the Phillips Petroleum Company, saturation of 42 percent and an aqueous phase saturation of 58 percent. Two curves are presented. One is for the case of distilled water as the aqueous phase while the order is obtained after flushing the sample with a solution containing a concentration of paramagnetic ions such that a bulk sample of the treated water had a thermal relaxation time $T_1$ of 13.6 milliseconds. Both measurements were conducted at 130° F. using the procedures given hereinabove for the extraction of signal in the presence of thermal noise.

The calculation of residual oil saturation from the thermal relaxation curve involves a two-step procedure. First, an extrapolated voltage $V_o(O)$ is obtained and, second, this voltage is converted into residual oil saturation. The extrapolation to $V_o(O)$ must be taken so that only those points are included which do not contain signal from the aqueous phase. This may be accomplished by including points only for values of $T_L > 5 (T_1)$ aqueous which, for these data, means including only those points for $T_L > 68$ milliseconds. The extrapolation shown in FIG. 8 is made on this basis and includes, six additional points for values of $T_L$ in excess of 600 milliseconds. $AV_o(O) = 195.2 \pm 1.8$ millivolts (where the confidence limits refer to one standard deviation) is obtained. The conversion of $V_o(O)$ to residual oil saturation is accomplished by determining $V_o(O)$ per gram of bulk hydrocarbon and using this figure to convert the extrapolated voltage in FIG. 8 to grams of hydrocarbon in the sample. Since the density of the hydrocarbon is known, a residual oil saturation in grams/unit volume or rock may be deduced. Also, in this case, since the pore volume of the sample is known, a residual oil saturation ($S_{or}$) in percent porosity may be calculated. The calculated $S_{or}$ of $40.5 \pm 1$ percent compares very favorably with an $S_{or}$ of $42 \pm 2$ percent known from volumetric balance. The "X" symbol in FIG. 8 refers to short components of Run 2 due to paramagnetically treated aqueous phase. The extrapolated voltage at $T_l = 0$ for Run 2 is equal to $195.2 \pm 1.8$ millivolts. This implies a percent oil saturation $S_{or}$ of $40.5 \pm 1.0$. $T_l$ refers to the low field polarizing time in milliseconds and $V_o(T_l)$ refers to voltage at time $T_l$, corrected by high field − low field ratio. The Run 2 data of FIG. 8 were fit by least squares to an exponential decay based on 9 points for $110 \leq T_l \leq 4,000$ milliseconds.

We claim as our invention:

1. A well logging method for determining residual hydrocarbons present in a subterranean earth formation by quantitatively determining the amplitude of the proton free-precession signal due to the protons contained in the hydrocarbons that are present in an interval of said subterranean hydrocarbon-bearing earth formation, said process comprising the steps of:

removing the fluid impermeability of a mud cake formed on the wall of a well borehole adjacent said interval;

pumping an aqueous solution through said well borehole and into said interval until substantially all of the space within said well borehole and said interval that was previously occupied by other aqueous liquid is occupied by said solution within a zone extending into said interval at least substantially as deeply as a nuclear magnetism measuring device is to be responsive to proton free-precession signals, said solution containing sufficient dissolved paramagnetic material to provide a water phase nuclear magnetism thermal relaxation time that is too short to be responded to by the nuclear magnetism measuring device;

positioning a nuclear magnetism measuring device in said well borehole adjacent said interval;

making a plurality of measurements of, respectively, noise in the absence of polarization and proton free-precession signal plus noise; and combining a function of the noise with a function of the signal plus noise in order to determine the signal amplitude at the end of said polarization.

2. The method of claim 1 including the step of filling said well borehole with fresh water prior to removing the fluid impermeability of the mud cake on the wall of said well borehole.

3. The method of claim 1 wherein the step of removing or making permeable said mud cake includes the step of swabbing said interval until formation water is produced from said interval of formation and any mud cake present on the wall of said well borehole adjacent said interval is substantially removed therefrom.

4. The method of claim 1 wherein the step of injecting an aqueous solution includes the step of injecting an aqueous solution of chelated paramagnetic material.

5. The method of claim 4 wherein the step of injecting an aqueous solution of chelated paramagnetic material includes the step of injecting a manganous versene solution.

6. The method of claim 5 including the step of following said injection of a manganous versene solution with an injection of a sufficient quantity of mud containing no magnetite into said interval to form a mud cake on the wall of said interval, said mud using as a make-up fluid the fluid from the previous step of injecting said aqueous solution.

7. The method of claim 6 including the step of following the formation of said magnetite-free mud cake on the wall of said interval with a disposition in the borehole of an aqueous liquid containing magnetite in suspension and manganous versene in solution.

8. The method of claim 1 wherein the step of injecting an aqueous solution into said interval includes the step of injecting enough of said aqueous solution to fill a zone extending approximately five feet into said interval from said well borehole.

9. The method of claim 1 wherein the step of making a plurality of measurements includes the step of making a plurality of measurements separated sufficiently in time to be independent.

10. The method of claim 1 including the step of utilizing the data obtained by combining a function of the noise with a function of the signal plus noise to determine the amount of oil per unit volume of earth formation that is present in said interval of earth formation.

11. The method of claim 1 wherein the step of removing the fluid impermeability of the mud cake formed on the wall of said well borehole includes the step of removing said mud cake from the wall of said well borehole.

12. The method of claim 1 wherein the step of removing the fluid impermeability of the mud cake formed on the wall of said well borehole includes the step of rendering said mud cake permeable to fluid.

* * * * *